Patented Jan. 9, 1951

2,537,643

UNITED STATES PATENT OFFICE 2,537,643

VINYL PROPARGYL ETHER

Kenneth C. Eberly, Akron, Ohio, assignor to The Firestone Tire & Rubber Company, Akron, Ohio, a corporation of Ohio No Drawing. Application May 5, 1948,
Serial No. 25,317

1 Claim. (Cl. 260—614)

This invention relates to a novel compound, vinyl propargyl ether, its preparation and its polymers and copolymers.

The vinyl propargyl ether to which this invention relates has the following structural formula:

$$CH_2=CH-O-CH_2-C\equiv C-H$$

This compound may be conveniently prepared, in accordance with this invention, by means of the following series of reactions:

$$HO-CH_2-CH_2-OH + Na \rightarrow$$
$$HO-CH_2-CH_2-ONa + Br-CH_2-CH=CH_2 \rightarrow$$
$$HO-CH_2-CH_2-O-CH_2-CH=CH_2 + PBr_3 \rightarrow$$
$$Br-CH_2-CH_2-O-CH_2-CH=CH_2 + Br_2 \rightarrow$$
$$Br-CH_2-CH_2-O-CH_2-$$
$$CHBr-CH_2Br + KOH \rightarrow$$
$$CH_2=CH-O-CH_2-C\equiv CH$$

The foregoing reactions may also be carried out with the use of the chloro and iodo analogs of the bromo compounds; also, in place of the phosphorus tribromide, there may be employed the phosphorus pentabromide and its chloro and iodo analogs. Likewise, in place of the sodium metal, there may be employed other alkali metals such as potassium, lithium, etc. Similarly, there may be employed sodium hydroxide, or other alkali metal hydroxide, in place of the potassium hydroxide.

The vinyl propargyl ether of this invention is adapted for many uses, for instance as an intermediate in the synthesis of ethyl propyl ethers bearing side groups. The compound finds particular application as a comonomer for use with vinyl, dienetype and other unsaturated polymerizable materials, and forms therewith copolymers which are initially fusible and soluble but which, upon further polymerization, become infusible and insoluble.

With the foregoing general discussion in mind, there are given herewith detailed examples of the practice of this invention. All parts given are by weight.

EXAMPLE I

*Preparation of 2-hydroxyethyl allyl ether*

| | Parts |
|---|---|
| Ethylene glycol (dry) | 1015 |
| Allyl bromide | 797 |
| Sodium metal (⅛" cubes) | 151.5 |

The sodium metal was gradually added to the ethylene glycol to yield the monosodium glycolate. This was then heated on a steam bath to 95° C., and the allyl bromide introduced in small portions over the course of one-half hour. The heating was continued for an additional 3 hours, after which the sodium bromide was removed by filtration.

The filtrate was then distilled under 20 mm. pressure and the fraction coming over in the range 65–67° was taken as substantially pure 2-hydroxyethyl allyl ether. The yield was 512.6 g. (76% of theory), $d_4^{20}$ 0.94, $n_D^{20}$ 1.4354.

*Preparation of 2-bromoethyl allyl ether*

| | Parts |
|---|---|
| 2-hydroxyethyl allyl ether (prepared as just described) | 276 |
| Pyridine | 55 |
| Phosphorus tribromide | 300 |

The 2-hydroxyethyl allyl ether and pyridine were mixed and added slowly, with stirring, to the phosphorus tribromide contained in a vessel cooled by an ice bath (the addition may be reversed). The mass was stirred for one and one-half hours, and then distilled under 36 mm. pressure. The fraction coming over in the range 68°–70° C. was washed successively with 5% sodium hydroxide, 10% sulfuric acid, and distilled water. The material was dried over anhydrous sodium sulfate and redistilled under 36 mm. pressure, the fraction coming over in the range 68°–69.5° C. being taken as substantially pure 2-bromethyl allyl ether. The yield was 97.4 parts (22% of theory) $d_4^{20}$ 1.343; $n_D^{20}$ 1.467.

*Preparation of 2-bromoethyl-2,3-dibromophopyl ether*

| | Parts |
|---|---|
| 2-bromoethyl allyl ether | 175 |
| Chloroform | 250 |
| Bromine | 170 |

The 2-bromoethyl allyl ether was dissolved in the chloroform, and the mixture cooled to −65° C. and maintained at this temperature during the subsequent reaction. The bromine was then added dropwise over the course of one and one-half hours, with continuous stirring. After the reaction was completed, the temperature was raised to 25° C., and the chloroform removed by distillation under reduced pressure, leaving a residue of crude 2-bromoethyl-2,3-dibromopropyl ether. The crude product was fractionated at 10 mm. pressure in a 42-cm. bead-packed column with a reflux ratio of 10:1. The material coming over in the range 139°–141° C. was taken as substantially pure 2-bromoethyl-2,3-dibromopropyl ether and amounted to 319 parts (93% of theory) $d_4^{20}$ 2.069; $n_D^{20}$ 1.5509.

Vinyl propargyl ether

| | Parts |
|---|---|
| 2-bromoethyl-2,3-dibromopropyl ether | 200 |
| Potassium hydroxide (powdered) | 300 |

A closed reaction vessel provided with electrical heating elements and with a condenser discharging to a product receiver was provided for the reaction. The potassium hydroxide was charged into the vessel, and the free space swept out with nitrogen, a nitrogen atmosphere being maintained throughout the subsequent process.

The reaction vessel was heated to 150° C., and the 2-bromoethyl-2,3-dibromopropyl ether introduced gradually on top of the potassium hydroxide over a period of 45 minutes. A vigorous reaction set in and a colorless liquid commenced to distill over into the receiver. After all the 2-bromoethyl-2,3-dibromopropyl ether had been introduced, the temperature was gradually raised to 170° over a period of 2 hours, at the end of which time no further products distilled over.

The liquid products so obtained were redistilled at atmospheric pressure, the portion "A" boiling under 85° being taken as crude vinyl propargyl ether, and the portion remaining undistilled at 85° C. being taken as incompletely dehydrobrominated material and subjected to a second treatment with potassium hydroxide identical with the treatment of 2 - bromoethyl - 2,3-dibromopropyl ether as described above, using 3 times its weight of powdered potassium hydroxide. The material distilled from this second reaction was combined with the portion "A" and the mixture fractionated through a 60-cm. bead-packed column at 746 mm., the fraction coming over in the range 78°–80° C. being taken as substantially pure vinyl propargyl ether and amounting to 24.2 parts (48% of theory).

The vinyl propargyl ether so obtained is a colorless liquid immiscible in water. Presence of acetylenic hydrogen is demonstrated by its reaction with alcoholic ammoniacal silver nitrate to give a colorless, crystalline precipitate. The compound reacts with dilute aqueous hydrochloric acid to yield principally acetaldehyde. The product polymerizes to some extent on standing several months in the dark. The physical properties are: boiling point 79° C. at 746 mm.; melting point −70° C.; $d_4^{20}$ 0.859; $n_D^{20}$ 1.4407. Analysis showed 73.14% carbon, 7.37 hydrogen, the theoretical values being 70.98 carbon, 7.82% hydrogen. The small discrepancy in the analysis is due to the explosive combustion habit of the vinyl propargyl ether.

EXAMPLE II

*Use of vinyl propargyl ether as cross-linking agent*

| Toluene: | Parts |
|---|---|
| A. COPOLYMER PREPARATION | |
| Original charge | 70 |
| Diluent | 50 |
| 2,3-dichloro-1,3-butadiene (containing .1% p-cresol) | 29.5 |
| Vinyl propargyl ether | 1.5 |

B. ADHESIVE FORMULATION

| | Parts |
|---|---|
| Chlorinated rubber (125 centipoise type) | 8 |
| 2,3-dichloro-1,3-butadiene plus vinyl propargyl ether copolymer gel (prepared from ingredients A) | 20 |
| Toluene | 33 |

A copolymer was made up from the materials listed at A. The 2,3-dichlorobutadiene and vinyl propargyl ether were dissolved in the original charge portion of the toluene and agitated at 75° C. for 18 hours. The resultant copolymer solution was then diluted with the diluent portion of toluene and cooled to room temperature. On cooling, the solution set to a stiff gel.

An adhesive formulation was then made up from the ingredients listed at B. The stiff gel prepared as just described was remelted at 80° C. and the remaining ingredients dissolved therewith by means of vigorous agitation. This solution was brushed-coated on sandblasted steel strips, and dried for 20 minutes at 75° C. The coated strips were molded into a conventional 60 durometer GR-S stock, and cured for 20 minutes at 320° F. The strips showed excellent adhesion to the elastomer stock even while hot from the molding operation, indicating an effective cross-linking of the dichlorobutadiene copolymer.

What is claimed is:

Vinyl propargyl ether.

KENNETH C. EBERLY.

REFERENCES CITED

The following references are of record in the file of this patent:

UNITED STATES PATENTS

| Number | Name | Date |
|---|---|---|
| 2,013,725 | Carothers | Sept. 10, 1935 |
| 2,104,717 | Chitwood | Jan. 4, 1938 |
| 2,146,752 | Lott | Feb. 14, 1939 |

OTHER REFERENCES

McCusker et al.: "Jour. Am. Chem. Soc.," vol. 59 (1937), pages 213–214.

Lespieau: Comptes Rendus, vol. 144 (1914), page 1162.